Mar. 3, 1925.
W. E. GREENAWALT
METALLURGICAL PROCESS
Filed Sept. 21, 1923
1,528,209
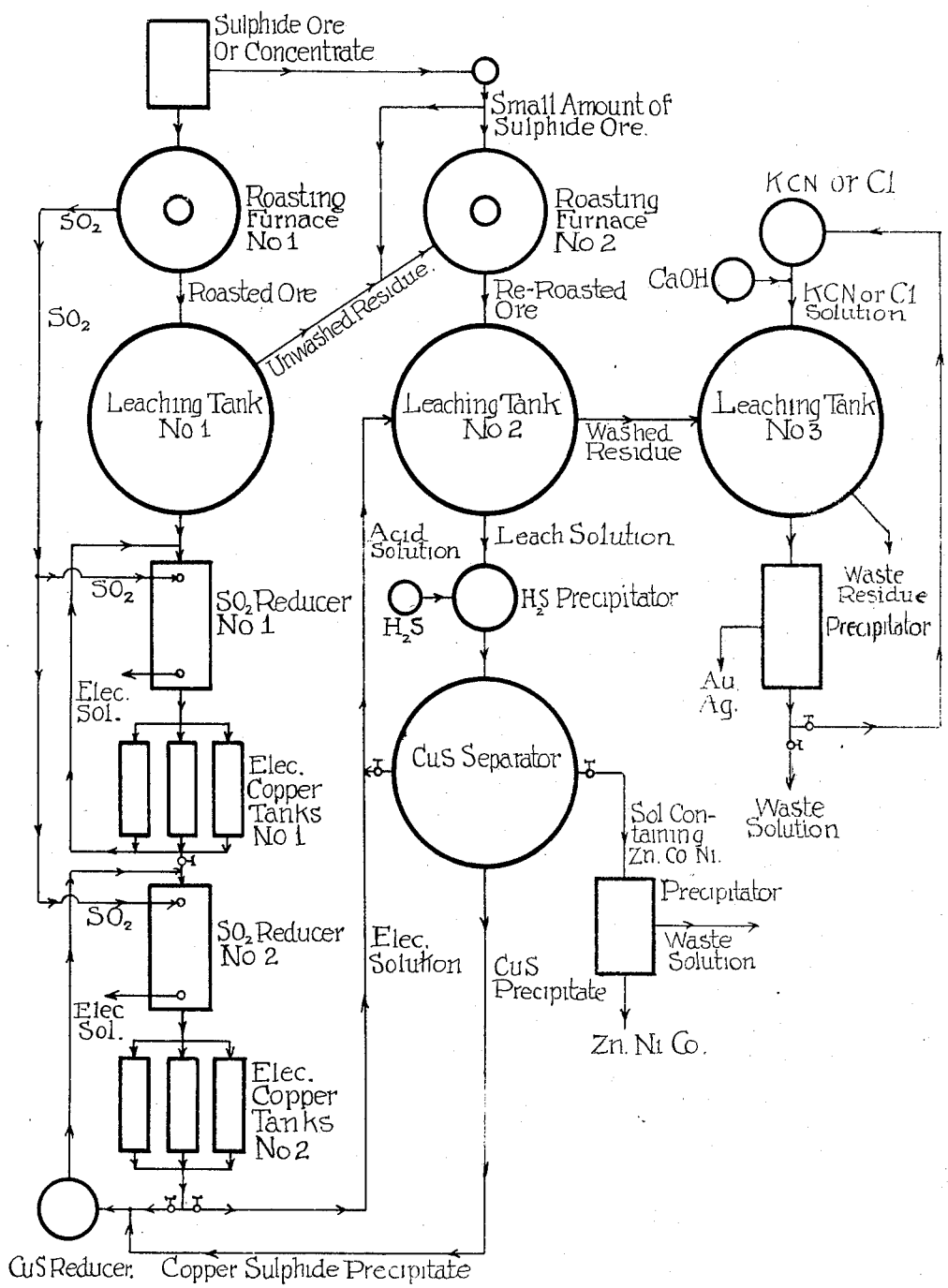
INVENTOR
William E Greenawalt Patented Mar. 3, 1925.

1,528,209

UNITED STATES PATENT OFFICE.

WILLIAM E. GREENAWALT, OF DENVER, COLORADO.

METALLURGICAL PROCESS.

Application filed September 21, 1923. Serial No. 664,085.

*To all whom it may concern:*

Be it known that I, WILLIAM E. GREENA-WALT, a citizen of the United States, residing in the city and county of Denver and State of Colorado, have invented certain new and useful Improvements in Metallurgical Processes, of which the following is a specification.

My invention relates to metallurgical processes and has as its object the more effective extraction of metals—especially copper—from their sulphide ores and concentrates.

The invention will be described more particularly in the treatment of sulphide copper ores and concentrates, and to copper ores and concentrates containing other metals.

The usual procedure, in producing copper from sulphide ores, is to first crush the ore, as mined, then separate the sulphide copper mineral from the gangue. This sulphide mineral, or concentrate, is then usually roasted and smelted to copper matte; the matte is blown to blister copper, and the blister copper is then refined electrolytically to obtain the electrolytic copper and to recover other valuable metals associated with the copper.

It has been proposed to roast and leach the sulphide concentrates instead of smelting them, and recover the copper from the leach solutions by electrolysis, with the simultaneous regeneration of acid which is then again applied to the ore, and the cycle repeated until the copper in the ore is sufficiently extracted, as set forth, for example, in my Patents No. 1,353,995 Sept. 28, 1920, and No. 1,357,495, Nov. 20, 1920.

In carrying out this process, it has been found difficult, although not impossible, to get a satisfactory extraction of the copper from the ore by the ordinary methods of roasting. This entails a loss of copper, and when the copper ore contains precious or other valuable metals, the difficulty of recovering these metals is also increased on account of the copper remaining in the residue.

Ordinarily cyanide is the most effective and economical method of extracting gold and silver from ores, but when the ores contain an appreciable amount of copper, the cyanide process becomes prohibitive on account of the high consumption of cyanide.

In the process referred to in the above mentioned patents, it is possible to remove a high percentage of copper from the leach solutions, containing high percentages of soluble salts, before the solution is returned to the ore. The electrolyzed solution, returned to the ore, usually contains a relatively small amount of copper, say from 1.0% to 1.5%; a large amount of soluble iron, say from 1.5% to 3.5% and a fairly large amount of free acid, say from 3.5% to 8.0%. This may illustrate, specifically, what may constitute the regular leach solution, altho it will be understood that the composition of the electrolyte and leach solution will necessarily be determined by the composition of the ore and the results desired.

In my pending application, Serial No. 485,885, filed July 19, 1921, attention is called to the effectiveness of re-roasting leach residues in obtaining high extractions of the metal content. The present invention is directed to a more or less specific application of the more general disclosure in said application.

The accompanying drawing represents a flow sheet of the invention, in diagrammatic plan.

I have found that very high copper extractions can be made, at a relatively small expense, by proceeding substantially as follows, assuming the ore to be a copper concentrate containing other metals:

The ore is roasted in the usual way, or as set forth in my pending application referred to, Serial No. 485,885, to get as high a sulphatization of the copper as possible. It is then leached with a dilute sulphuric acid solution to extract the copper. The resulting solution is then electrolyzed to deposit the copper with the simultaneous regeneration of acid. By using sulphur dioxide as a reducing agent for the ferric iron formed by the electrolysis, from 2.5 to 3.0 pounds of acid are produced per pound of copper deposited. This regenerated acid solution is returned to the ore and the cycle continued until the readily soluble copper is extracted from the ore. By this process the solution is built up in acid and soluble salts—principally salts of iron. Then, preferably without water-washing the ore, and preferably without any extra treatment, the regular solution, or electrolyte, is drained from the ore, and the ore removed from the leaching tank and re-roasted, preferably with the addition of a small amount of raw ore, or pyritic material. Usually from 5.0% to 8.0% of pyritic cencentrate will give the best results. In drying the ore, either before re-roasting, or as part of the re-roasting operation, the water is evaporated, thus leaving the acid and soluble salts, from the residual solution after draining, in the pores of the leached ore residue. These salts and acid, together with a small amount of pyritic material, act very effectively on the remaining copper during re-roasting, so that a high percentage of the remaining copper can be made soluble in water and a very high percentage soluble in dilute acid. This re-roasted material is then re-leached and carefully washed to extract the remaining copper. Other metals, such as zinc, nickel, and cobalt are also quite closely extracted by this method.

If the ore contains precious metals, the copper in the final ore residue is usually so low after the re-roasting and re-leaching and careful water washing that the residues may easily be made amenable to cyanide treatment for the extraction of the gold and silver.

In the operation of this process, the first roasting need not be carried out with the same care as in the usual methods of roasting for leaching. Similarly, the first leaching need not be done with any great care, and washing of the ore after the first leaching may be, and preferably is, entirely dispensed with. The relatively small amount of copper remaining in the ore due to the regular leach solution, after draining, is recovered in the final leaching. Any process is greatly complicated by washing the ore, after the first leaching, or by treating the leach residues with a special solution before re-roasting. Displacing one solution in the ore by another, complicates the process and greatly increases the expense of any leaching method. This is unnecessary by the present process, and the idea is, not to displace the residual regular solution, or any considerable portion of it from the ore by a different solution, preparatory to re-roasting for the final leaching, but to control conditions so that washing or displacement will not be necessary nor desirable in the first leaching operation.

If the ore contains zinc, nickel, cobalt, etc., in addition to the copper, these metals are also closely extracted.

If the residues contain precious metals, the residues, after the final leaching are thoroughly washed, made alkaline, and then treated with cyanide to extract the gold and silver. In this way a very high percentage of recovery of the gold and silver can be made, due to the previous removal of the copper, which exposes the gold and silver to attack by the cyanide.

The operation of the process may be illustrated by the following example.

A flotation copper concentrate was roasted and leached with the following results:

Head, roasted concentrate _____ 13.60% copper
Water soluble_____ 3.38% copper
Acid soluble _____ 10.40% copper
Leach tails _____ 3.20% copper
Percentage extraction_____ 77.2 %

The leach residue without washing, or any considerable washing, was mixed with about 5.0% of copper bearing sulphide concentrate and re-roasted and re-leached, as described, with results as follows:

Head, roasted residue _____ 3.68% copper
Water soluble ____ 3.28% copper
Acid soluble _____ 3.34% copper
Residue _____ 0.34% copper
Percentage, total extraction _____ 97.3 %

As another example, a pyritic concentrate was roasted and leached with inferior results, as follows:

Head, roasted ore__ 4.41% copper
Acid leach tails____ 1.55% copper
Extraction _____ 64.8 %

The leach residue, without washing, was then re-roasted with the addition of about 5–0% concentrate and re-leached, as described, results as follows:

Tails, final residue _____ 0.20%
Total percentage extraction _____ 97.3 %.

The process has been described more particularly in connection with sulphatizing roasting and sulphate leaching: it is equally applicable to chloridizing roasting and chloride leaching. It is best adapted to the treatment of high grade ores and concentrates, especially high grade ores and concentrates containing copper associated with precious or other metals, such as zinc, nickel and cobalt.

This process may be considered a modification of (Patent No. 1,468,806, Sept. 25, 1923) that described in my pending application Serial No. 485,885, filed July 19, 1921.

I claim:

1. A process of treating copper ore comprising roasting the ore, leaching the roasted ore with a dilute acid solution to extract a portion of the copper, electrolyzing the resulting copper solution to deposit the copper and regenerate acid, applying the electrolyzed solution impoverished in copper and enriched in acid and containing soluble salts to the ore and repeating the cycle until the readily soluble copper is extracted, then draining the solution from the ore, and then re-roasting the ore in the presence of the salts from the residual solution after draining, and leaching the re-roasted ore to extract the remainder of the copper.

2. A process of treating copper ore, comprising roasting the ore, leaching the roasted ore with a dilute acid solution to extract a portion of the copper, electrolyzing the resulting copper solution to deposit the copper and regenerate acid, returning the electrolyzed solution impoverished in copper and enriched in acid and containing soluble salts to the ore, and repeating the cycle until the readily soluble copper is extracted, then draining the solution from the ore, adding a relatively small amount of pyritic material to the leached ore and then re-roasting the ore containing the soluble salts from the residual solution after draining, and leaching the re-roasted ore to extract the remainder of the copper.

3. A process of treating copper ores containing precious metals comprising roasting the ore, leaching the roasted ore with dilute acid solution to extract a portion of the copper, electrolyzing the resulting copper solution to deposit the copper and regenerate acid, returning the electrolyzed solution impoverished in copper and enriched in acid and containing soluble salts to the ore and repeating the cycle until the readily soluble copper is extracted, then draining the solution from the ore, and then re-roasting the ore containing the acid and soluble salts from the residual solution after draining, and leaching the re-roasted ore to extract the remaining copper, thoroly washing the residue, and then treating the residue to extract the precious metals.

4. A process of treating ores of metals comprising roating the ore leaching the roasted ore with dilute acid solution to extract a portion of the metals, precipitating the resulting metal solution with the simultaneous regeneration of acid, returning the regenerated acid solution containing soluble salts to the ore and repeating the cycle until the readily soluble portion of the metals is extracted, then draining the solution from the ore and then without displacing the salts of the residual leach solution from the ore after draining, re-roasting the ore and leaching the re-roasted ore to extract the remaining metals.

5. A process of treating ores of metals, comprising roasting the ore, leaching the roasted ore with dilute acid solution to extract a portion of the metals, precipitating the metals from the resulting solution with the simultaneous regeneration of acid, returning the regenerated acid solution to the ore and repeating the cycle until the readily soluble portion of the metals is extracted, then draining the solution from the ore, and then without displacing the soluble salts of the residual leach solution from the ore after draining adding a relatively small portion of pyritic material to the ore, re-roasting the ore, and leaching the re-roasted ore to extract the remaining metals.

6. A process of treating ores of metals containing copper comprising, roasting the ore, leaching the roasted ore with dilute acid solution to extract a portion of the metals, precipitating some of the metals from the resulting solution, returning the solution to the ore and repeating the cycle until the readily soluble portion of the metals is extracted, draining the solution from the ore, and then without displacing the soluble salts of the residual leach solution from the ore after draining re-roasting the ore, applying a portion of the leach solution to the re-roasted material to extract the remaining metals, precipitating the copper from the resulting solution, and then recovering the remaining metals such as zinc, nickel, or cobalt, from the solution.

7. A process of treating ores of metals comprising, roasting the ore, leaching the roasted ore with dilute acid solution to extract a portion of the metals, precipitating a portion of the metals from the resulting solution and returning the solution to the ore and repeating the cycle until the readily soluble metals in the ore are extracted, then without displacing the residual leach solution from the ore after draining re-roasting the ore, applying a portion of the leach solution from treating the roasted ore to the re-roasted ore, precipitating some of the metals from the resulting solution with the simultaneous regeneration of acid, and then recovering other metals such as zinc, nickel, and cobalt from the resulting solution.

8. A process of treating ores containing precious and other metals comprising, roasting the ore, leaching the roasted ore with an acid solution to extract a portion of the metals, precipitating a portion of the metals from the resulting solution and returning the solution to the ore and repeating the cycle until the readily soluble metals are extracted, then without displacing the residual leach solution from the ore after draining re-roasting the ore, re-leaching the re-roasted ore with an acid solution to extract the remaining portion of the metals soluble in acid solution, then washing the acid leached residue and leaching it with an alkaline solution to extract precious metals.

9. A process of treating ores containing precious and other metals comprising, roasting the ore, leaching the roasted ore with an acid solution to extract some of the metals, precipitating a portion of the metals from the resulting solution and returning the solution to the ore and repeating the cycle until the readily soluble metals are extracted, then without displacing the residual leach solution from the ore after leaching re-roasting the ore, re-leaching the re-roasted ore to extract some of the remaining portion of the metals, precipitating the metals from the resulting solution, and then treating the leached residue to extract the precious metals.

WILLIAM E. GREENAWALT.